United States Patent [19]

Suggitt et al.

[11] 3,926,842

[45] Dec. 16, 1975

[54] METHOD OF REGENERATING SPENT HYDROALKYLATION CATALYST CONTAINING AN OXIDIZABLE GROUP VIII METAL

[75] Inventors: Robert M. Suggitt, Wappingers Falls; John M. Crone, Jr., Fishkill, both of N.Y.

[73] Assignee: Texaco Inc., New York, N.Y.

[22] Filed: Jan. 2, 1973

[21] Appl. No.: 320,215

[52] U.S. Cl. ............ 252/411 R; 252/416; 260/667; 260/668 R; 260/668 F
[51] Int. Cl.² ................. B01J 23/94; C07C 5/10; C07C 15/00; B01J 29/38
[58] Field of Search .......... 252/411, 416; 260/668 F

[56] References Cited
UNITED STATES PATENTS

| | | | |
|---|---|---|---|
| 3,132,091 | 5/1964 | Young | 252/411 R |
| 3,210,265 | 10/1965 | Garwood | 252/411 R |
| 3,211,642 | 10/1965 | Unverferth | 252/411 R |
| 3,238,120 | 3/1966 | Sale | 252/411 R |
| 3,412,013 | 11/1968 | Bowles | 252/411 R |
| 3,459,675 | 8/1969 | Crecelius et al. | 252/411 R |
| 3,558,514 | 1/1971 | Schutt | 252/411 R |
| 3,590,007 | 6/1971 | Schutt | 252/411 R |
| 3,591,522 | 7/1971 | Cosyns et al. | 252/411 R |
| 3,760,017 | 9/1973 | Arkell et al. | 260/668 F |
| 3,760,019 | 9/1973 | Crone, Jr. et al. | 260/668 F |
| 3,869,523 | 3/1975 | Suggitt et al. | 260/668 R |

FOREIGN PATENTS OR APPLICATIONS

| | | | |
|---|---|---|---|
| 1,503,792 | 10/1967 | France | 252/411 R |

*Primary Examiner*—Winston A. Douglas
*Assistant Examiner*—P. E. Konopka
*Attorney, Agent, or Firm*—C. G. Ries; T. H. Whaley; Carl G. Seutter

[57] ABSTRACT

Spent catalysts, containing active metals such as cobalt or nickel on an acidic oxide support such as a silica-alumina cracking catalyst, are regenerated by heating to regeneration temperature in the presence of hydrogen.

6 Claims, No Drawings

3,926,842

METHOD OF REGENERATING SPENT HYDROALKYLATION CATALYST CONTAINING AN OXIDIZABLE GROUP VIII METAL

BACKGROUND OF THE INVENTION

This invention relates to a novel process for regeneration of spent catalyst. More specifically, it relates to a process for regenerating hydroalkylation-type catalysts.

As is well known to those skilled in the art, catalysts are used in many reactions typified by hydrogenation, alkylation, cracking, hydroalkylation, etc. During these reactions, the catalyst initially operates at a high level of activity; and over a period of time, the level of activity decreases to a point at which continuing operation is no longer economical.

During hydroalkylation of benzene for example, benzene charge may be passed into a hydroalkylation reactor (together with hydrogen in hydroalkylating amount of 0.2–10, preferably 0.2–3 parts, say 1.8 parts per 100 parts of benzene). Reaction may occur at inlet temperature of 167°–392°F. (75°–200°C), preferably 212°–374°F. (100°–190°C.), say 266°F. (130°C.) at 100–1500 psig, preferably 100–500 psig, say 500 psig. The pressure is normally sufficient, at the beginning of the reaction, to maintain the reactants substantially in liquid phase (except for the hydrogen which is in gas phase).

Hydroalkylation may be effected in the presence of a hydroalkylation catalyst and a hydroalkylating quantity of hydrogen. The hydrogen need not be pure; but preferably hydrogen of 80–100 percent purity may be used. The hydrogen should preferably be free of impurities, including sulfur and oxygen, which may poison the catalyst. The charge benzene and the hydrogen should desirably be free of water.

Commonly hydroalkylation catalysts include an oxidizable Group VIII transition metal, typically cobalt or nickel. A preferred type of catalyst may include a Group VIII metal selected from the group consisting of nickel or cobalt, and preferably 0–30 percent, typically 10–20 percent, say 19 percent of a Group VI metal, typically tungsten, on a silica-alumina or zeolite catalyst support. When the Group VIII metal is cobalt or nickel, it will preferably be present in amount of 2–30 percent, typically 4–25%, say 6 percent.

Such a catalyst may be prepared for example by impregnating a commercial $NH_4$-exchanged Y-type zeolite catalyst with eg nickel nitrate (or cobalt nitrate) and thereafter with ammonium metatungstate solution and then drying the catalyst in air at e.g. 212°F. (100°C). The so dried catalyst may be further dried at 302°F. (150°C.) and then calcined to a maximum temperature of 1472°F. (800°C.).

During calcining, the nitrates are decomposed and the catalyst is dehydrated. The catalyst may (after loading into a hydroalkylation unit) then be reduced in the presence of hydrogen for a minimum of 1 hour and typically at least 4–8 hours at a temperature preferably above 750°F. (400°C.) and more preferably 842°–1292°F. (450°C. 700°C.), say 932°F. (500°F).

A so-prepared typical catalyst may contain on a dry basis, 6 percent nickel, 19 percent tungsten, and 22 percent hydrogen-Y zeolite, the remainder being amorphous silica-alumina support.

A preferred type of catalyst with which this invention may be concerned is a hydroalkylation catalyst containing (a) a Group VIII metal selected from the group consisting of cobalt and nickel and (b) an acidic oxide support selected from the group consisting of silica-alumina, and hydrogen Y-zeolite.

The activity of such a hydroalkylation catalyst may decrease with time on stream. To compensate for this slow deactivation and to maintain the hydroalkylation reaction, it is found that the severity of the process conditions must be gradually increased. One well known way to increase reaction severity is to raise temperature. An alternate method, for the hydroalkylation reaction, is to increase reaction pressure. Generally, with a very active catalyst the reaction pressure is relatively low. All of the hydrogen added to the large excess of aromatic (benzene) is consumed. With time-on-stream, the reaction pressure required to consume all of the hydrogen gradually increases-indicating that the catalyst activity is declining. However, the total conversion remains essentially constant with all of the hydrogen consumed. When the total pressure reaches a pre-established upper limit, unreacted hydrogen is drawn off along with product and the total conversion declines. With active nickel or cobalt catalysts and feeds thoroughly dried, the hydroalkylation reaction can be operated for hundreds of hours before catalyst regeneration is required. The time between regenerations is much shorter if the feed contains water.

Conversion may also be maintained by raising the inlet temperature. However, since reaction selectivity declines with increasing temperature, when the maximum reaction temperature reaches a limit (250°C, preferably 210°C) where the selectivity is no longer acceptable, the catalyst must be regenerated.

Prior attempts to regenerate such catalysts have been carried out by heating the catalyst in low concentrations of oxygen (dilute air) to temperatures of eg 300° to 650°C. Typical of disclosures relating to catalysts and their use in hydroalkylation may include U.S. application Ser. No. 144,211 filed May 17, 1971 by Texaco Inc. as assignee of Alfred Arkell, John M. Crone Jr. and Robert M. Suggitt (now U.S. Pat. No. 3,760,017) and Ser. No. 144,214, filed May 17, 1971 by Texaco Inc. as assignee of John M. Crone Jr. and Alfred Arkell (now U.S. Pat. No. 3,760,019).

It is an object of this invention to provide a method of regenerating a spent catalyst. It is another object of this invention to regenerate spent catalyst to yield a catalyst of high selectivity.

STATEMENT OF THE INVENTION

In accordance with certain of its aspects, the method of this invention for regenerating a spent catalyst containing (a) an oxidizable Group VIII metal preferably selected from the group consisting of cobalt and nickel, and (b) an acidic oxide support selected from the group consisting of silica-alumina and zeolite may comprise heating said spent catalyst to regeneration temperature thereby regenerating said spent catalyst; and maintaining said spent catalyst during regeneration in the presence of an inert gas containing at least 30 mole percent hydrogen.

DESCRIPTION OF THE INVENTION

The charge catalyst which may be treated by the process of this invention may include a spent catalyst containing (a) an oxidizable Group VIII metal, typically nickel or cobalt, and 0–30 percent, typically 10–20 percent, say 19 percent of a Group VI metal such as tungsten and (b) an acidic support selected from the group consisting of silica-alumina and zeolite. Typical of such catalysts may be:

i. A catalyst containing 6 percent nickel and 19 percent tungsten on a hydrogen Y zeolite dispersed in a silica-alumina matrix;

ii. a catalyst containing 8 percent cobalt on a support containing 16 percent rare earth-exchanged zeolite Y (atom. ratio of Si: Al of 2.4:1 in the zeolite) dispersed in a silica-alumina matrix. The composition, including rare earth-exchanged zeolite Y, contains 0.97 percent lanthanum, 0.41 percent cerium, 0.42 percent neodymium, and 0.07 percent sodium;

iii. a catalyst as in (ii) except containing 4 percent cobalt;

iv. a catalyst as in (ii) except containing 22 percent cobalt; etc.

Preferably the catalysts which may be regenerated by the process of this invention may be hydroalkylation catalysts, and more typically hydroalkylation catalysts which have been initially activated by treatment with hydrogen at temperatures which may be 800°F. (427°C.) or higher. The carbon content of such catalysts when fresh may typically be less than about 0.05 percent; and the sulfur content of the catalyst after calcination at e.g. 800°C. may typically be less than about 0.05 percent (expressed as sulfate). The activity of such a catalyst, eg catalyst (i) supra, is typically about 11 percent as measured in terms of a standard test procedure in which benzene and hydrogen are passed at 900°F. (482°C.) inlet temperature, 500 psig, and 4 LHSV for 4 hours over the catalyst. Activity is measured in terms of the weight percent of cyclohexylbenzene formed.

After about 10 hours on stream (typically with wet feed), the activity may be as low as 4.5 percent.

Reactivation or regeneration of catalyst in practice of the process of this invention may be carried out by heating the spent catalyst, which has preferably been initially treated with hydrogen at temperatures typically above about 800°F (427°C), in the presence of an inert gas containing at least about 30 mole percent hydrogen. The inert gas will preferably be substantially free of active components which are capable of reacting with any of the materials in the system. It is particularly desirable that the inert gas be free of oxidizing components including oxygen.

The inert gas may contain helium or more preferably light paraffins such as ethane, methane, propane, etc. Hydrogen may be present typically in amount of 30–100 mole percent, preferably 80–100 mole percent, say 100 mole percent; i.e. the preferred inert gas may consist essentially of hydrogen. When regeneration is carried out at atmospheric pressure, as in the preferred embodiment, the partial pressure of hydrogen may be at least about 9 psig (400 mm. Hg.) preferably 12–15 psig, say 15 psig (760 mm Hg). Preferably the spent catalyst may be maintained, during regeneration, in contact with a stream of flowing hydrogen typically flowing at a space velocity VHSV greater than about 3, more preferably greater than 100, say 100–500.

The temperature of regeneration may be 527°–1292°F, (275°–700°C), preferably 590°–1200°F. (310°–650°C.), more preferably about 600°–950°F (315°–510°C), say 900°F. (482°C.). Although regeneration may be effected at temperatures up to the maximum at which the catalyst is stable eg about 1112°–1472°F. (600°–800°C), it is a feature of the process of this invention that it may be carried out at unusually low temperatures — typically down to 527°F (275°C), but more preferably down to eg 600°F. (315°C.).

When the catalyst is used as a hydroalkylation catalyst for example, it may be desirable to regenerate the spent catalyst of decreased activity by decreasing the flow of hydrocarbon and permitting the hydrogen-rich stream to pass through the catalyst. More preferably however, the flow of hydrocarbon may be stopped completely and the hydrogen stream permitted to pass through the catalyst bed.

In the preferred embodiment, the spent catalyst will be regenerated in the presence of substantially pure hydrogen eg hydrogen of 80–95 percent or greater purity. Preferably the hydrogen is free of oxidizing materials including air or oxygen and preferably also it may contain a minimum of hydrocarbon components.

In the preferred embodiment, regeneration may be effected at a pressure of 10–1500 psia, a more preferably 15–600 psia, say 15 psia (1 atmosphere pressure;) and the partial pressure of the hydrogen may be 8–1500 psia, preferably 12–600 psia, say 15 psia.

Regeneration over 1–24 hours, preferably 2–12 hours, say 4 hours in the presence of hydrogen permits attainment of a regenerated catalyst characterized by a high degree of activity and selectivity.

More significantly, it may be found that the activity may be increased from its low level of eg 5–15 percent to a level of 15–30 percent depending on operating conditions including the amount of hydrogen added. Commonly, practice of this invention permits attainment of regenerated catalyst wherein the level of activity of the regenerated catalyst may be 80–130 percent, say 90–110 percent of that of the fresh charge catalyst.

In accordance with certain aspects of this invention, the spent catalyst, prior to regeneration in the presence of hydrogen, may be heated to 300°–500°C., in the presence of air (or other gases such as nitrogen or helium) to remove moisture — especially so when the moisture content of the catalyst is substantial. When the catalyst contains a substantial content of carbon, it may also be subjected to oxidation at 400°–650°C. in the presence of oxidizing gas, such as air, to lower the carbon content to operable levels. When the catalyst contains both undesirably high carbon and moisture, both may simultaneously be removed at the higher temperature. If the catalyst is heated in the presence of oxygen, then the subsequent hydrogen treatment should be at a temperature of at least 426°C. (800°F).

It is unexpectedly found however that merely heating the spent catalyst under conditions adequate to lower the moisture content to "satisfactory levels" has little or no impact upon the level of activity. Thus in a typical case, a catalyst of initial activity of 17.5 percent and a spent activity of 12.3 percent may (upon heating in helium to remove moisture) have its activity actually decreased to a level of 6.7 percent which is unsatisfactory.

It is particularly unexpected that any significant change or improvement in activity could be effected by heating in the presence of hydrogen-since the typical reaction (eg hydroalkylation) is conducted in the presence of hydrogen at conditions which would appear to be conducive to reduction of any oxides formed within the catalyst bed.

DESCRIPTION OF THE PREFERRED EMBODIMENT

Practice of the novel process of this invention may be apparent to those skilled in the art from inspection of the following wherein, as elsewhere in this specification, all parts are parts by weight unless otherwise stated.

EXAMPLE I

In this control example, hydroalkylation was effected over a hydroalkylation catalyst containing 6 percent nickel and 19 percent tungsten on a support containing 22 percent hydrogen Y zeolite disposed in a $SiO_2$-$Al_2O_3$ matrix. Prior to use, the catalyst was pretreated by reducing in a stream of hydrogen at 480°C (896°F) for 4 hours.

Hydroalkylation was effected by passing benzene (containing 119 ppm water) and hydrogen at a space velocity of 4 LHSV at 275°F. (135°C) and 500 psig through the catalyst bed for 24 hours. The initial hydroalkylation activity (in terms of weight percent cyclohexyl benzene formed) was 11 percent.

As hydroalkylation continued, the activity dropped essentially linearly to about 4.6 percent at 24 hours.

The temperature of hydroalkylation was then increased to 325°F. (163°C.) over 24 hours during which time the activity rose to and remained essentially constant at about 7.5 percent.

At this point, the benzene feed was switched to dry benzene (dried by passage through a 4A zeolite bed at 2 LHSV at room temperature) and hydroalkylation was continued at 325°F. (163°C.) for 12 hours. During this period, the activity increased to 8.4 percent.

Hydrogen was then shut off and the temperature was raised to 650°F. (343°C.) in an attempt to sweep water from the catalyst with dry benzene. After cooling, hydroalkylation was resumed at 325°F. (163°C.) and 4 LHSV; and the catalyst activity thereafter was 5.6–6.2 percent.

Clearly the use of a dry benzene feed during hydroalkylation (after the catalyst has been contacted with wet benzene) does not significantly increase the activity of the reaction; nor does the use of an inert gas sweep restore catalyst activity.

EXAMPLE II

In this example which represents practice of the invention, hydroalkylation was carried out as in Example I using the same catalyst at 2 LHSV, 300°F. (149°C.) and 500 psig over 60 hours with undried benzene as charge. The initial activity of the catalyst of 11 percent dropped to 1.6 percent.

At this point, the benzene feed was shut off and the catalyst heated for 2 hours at 800°F. (427°C.) in the stream of hydrogen. Upon cooling to 300°F. (149°C.), the catalyst was used for hydroalkylation and its activity (at 300°F. and 2 LHSV) was found to be 14.5 percent.

This is an unexpected improvement of 133 percent over the 11 percent initial activity of the catalyst.

EXAMPLE III

In this example which represents practice of the invention, the catalyst of Example I was used to hydroalkylate undried benzene at 325°F. (163°C), 500 psig, and 2 LHSV over 82 hours. At this point, the activity of the catalyst had dropped from 16.1 percent down to 6.8 percent.

The unit was flushed with benzene (the hydrogen flow having been stopped) at 325°F. (163°C.). Following a flushing with nitrogen, the catalyst was burned with increasing amounts of air in the nitrogen stream at 900°F. (482°C). Thereafter the air was displaced with nitrogen, and hydrogen was introduced at 900°F.

On cooling and using in hydroalkylation under the same conditions as supra, the activity was 20.8 percent — compare the activity of 16.1 percent of the fresh catalyst.

The product analyses for Example III are set forth in the following table wherein Column A indicates the wt% composition of Product using fresh catalyst at the beginning of the run, Column B indicated the Wt percent composition of Product at the end of the run, and Column C indicates the wt% composition of Product using the regenerated catalyst.

TABLE I

| Product | A | B | C |
|---|---|---|---|
| Methylcyclopentane | 1.4 | 0.1 | 1.8 |
| Cyclohexane | 6.2 | 0.6 | 3.8 |
| Benzene | 74.3 | 92.3 | 70.3 |
| Cyclohexylbenzene impurities | 0.6 | — | 0.6 |
| Cyclohexylbenzene | 16.1 | 6.8 | 20.8 |
| Dicyclohexylbenzenes | 1.4 | 0.2 | 2.7 |
| % H consumed to make by-2-Product $C_6$ naphthenes | 53 | 22 | 38 |

It will be noted that the regenerated catalyst permits production of a product containing 20.8 percent cyclohexylbenzene which is about 25 percent greater then that (16.1%) obtained with fresh catalyst. In addition to being more active, the regenerated catalyst is also more selective in that it yields product containing only 5.6 percent (i.e. 1.8% plus 3.8%) $C_6$ naphthenes in comparison to the fresh catalyst which yields 7.6 percent (i.e. 1.4% plus 6.2%). It is also noted that the impurities in the cyclohexyl benzene fraction are only 2.86 percent (0.6/20.8) in the regenerated catalyst as against 3.71 percent (0.6/16.1) in the fresh catalyst.

EXAMPLES IV – VI

A catalyst comprising 8 wt percent cobalt impregnated onto a rare earth exchanged zeolite Y dispersed in a silica-alumina matrix was calcined in air at 800°C for 3 hours and then treated with a flow of hydrogen at a VHSV of 320 for 2 hours at 500°C. and atmospheric pressure.

Benzene that had been dried by contact with molecular sieves was used as feed. The inlet temperature to the catalyst was 250°F (121°C.). All of the hydrogen fed to the unit was consumed and the reactor pressure was 460 psig. The product is characterized by the data in Column IV of Table II.

After a total period of 28 hours operation, the catalyst activity had declined as evidenced by an increase in unit pressure to 500 psig and by the appearance of hydrogen in the off-gas even though the inlet temperature had been raised to 320°F (160°C) (Product V).

At this point, the benzene feed was discontinued and the reactor was heated with 320 VHSV of flowing hydrogen to 500°C for 2 hours at atmospheric pressure. Upon cooling, the reaction was resumed with an inlet temperature of 265°F (130°C) and reactor pressure of 410 psig (Product VI). All of the hydrogen added was consumed.

It will be apparent from the following Table that the hydrogen sweep at 500°C restored the activity of the catalyst, as measured in terms of cyclohexylbenzene produced. It is also seen that, although the total hydrogen consumption is the same, the selectivity of the rejuvenated catalyst is higher for cyclohexylbenzene than is the original catalyst. More cyclohexylbenzene is made while the amount of $C_6$ naphthenes formed is reduced.

TABLE II

| Product | IV | V | VI |
|---|---|---|---|
| Hours on Stream | 6 | 28 | 10 (after rejuvenation) |
| Reactor Conditions | | | |
| Inlet Temp. °F. | 250 | 320 | 265 |
| Unit Pres, psig | 460 | 500 | 410 |
| LHSV, benzene | 2 | 2 | 2 |
| Hydrogen Flow | | | |
| moles $H_2$/mole benzene | 0.64 | 0.62* | 0.63 |
| Product Analysis | | | |
| Methylcyclopentane | 1.4 | 0.2 | 1.1 |
| Cyclohexane | 6.4 | 3.7 | 4.9 |
| Benzene | 53.3 | 77.1 | 51.0 |
| Cyclohexyl benzene | | | |
| Impurities | 1.1 | 0.14 | 1.1 |
| Cyclohexyl benzene | 26.0 | 13.5 | 29.9 |
| DCHB Impurities | 0.3 | 0.04 | 0.5 |
| Dicyclohexyl benzenes | 11.5 | 5.3 | 11.5 |
| Percent of Hydrogen Consumed | | | |
| to form $C_6$ Naphthenes | 34% | 40% | 27% |

*Hydrogen not completely consumed

EXAMPLES VII–X

A catalyst was prepared by impregnating 4 wt. percent cobalt on a support comprising 22 percent hydrogen Y-zeolite dispersed in silica-alumina matrix, drying, and calcining at 800°C for 3 hours. This catalyst was then placed in a 100 cc evaluation unit and treated with flowing hydrogen at a VHSV of 300 at 495°C. for 4 hours at atmospheric pressure.

For Example VII, feed containing 20 ppm water in benzene was prepared as follows: The benzene was dried over silica gel, then stored over sodium ribbon. After removal of the sodium, water was added to give a benzene feed containing 20 ppm water. The wet feed was then passed over the catalyst for 86 hours. The initial unit pressure was 360 psig.

Over a period of 86 hours, the pressure required gradually increased to 500 psig. The conversion decreased during this period. As the pressure increased, all other conditions were constant with 138°C inlet temperature, 2 LHSV of the benzene feed, and a hydrogen: benzene mole ratio of 0.75:1. The following Table III notes certain characteristics of the operation at selected times:

TABLE III

| Time-on Stream Hours | Unit Pressure psig | $C_6$ Naphthenes | Cyclohexyl benzene Wt % in product | DCHB Wt % in product |
|---|---|---|---|---|
| 10 | 360 | 18.6 | 17.5 | 4.9 |
| 42 | 420 | 21.5 | 14.7 | 2.2 |
| 70 | 450 | 22.5 | 12.4 | 1.5 |
| 82 | 480 | 23.6 | 12.3 | 1.4 |

In Table IV, the column headed Example VII shows the detailed characteristics of the product after 10 hours operation; and that headed Example VIII shows the characteristics of the product after 82 hours. In Example IX, after 86 hours of operation with the "wet" feed, dry benzene (sodium treated) was charged for 16 hours. The catalyst activity showed some improvement as indicated by a reduction in unit pressure to 450 psig and a gain in conversion back to 1.84 percent dicyclohexyl benzenes, 23.33 percent $C_6$ naphthenes, and 13.2 percent cyclohexyl benzene. However, the catalyst did not regain the high initial activity when water is eliminated from the feed.

In Example X, the benzene feed was then shut off, and the catalyst was heated in a stream of helium at 300 VHSV to 495°C for 4 hours at atmospheric pressure. After cooling down, the unit was restarted using dry benzene (silica gel followed by sodium treatment). Inlet temperature was 155°–160°C, pressure 500 psig, 2 LHSV benzene flow, and a hydrogen: benzene mole ratio of 0.8. Surprisingly the catalyst after "drying out" was relatively inactive with a conversion to only 6.71 percent cyclohexyl benzene even though the inlet temperature was higher. The catalyst was also non-selective as shown by the high content (16.34%) of $C_6$ naphthenes in the product. This shows that simply drying the catalyst by heating with inert gas does not reactivate the catalyst. In fact, the performance of the catalyst was degraded further even though the catalyst was heated in an oxygen-free environment. When the catalyst given this helium treatment in Example X is again heated to 480°C but in a stream of hydrogen, the activity of the catalyst is fully restored to the initial level.

TABLE IV

| | Ex. VII "wet" benzene 10 hours | Ex. VIII "wet" benzene 82 hours | Ex. IX Dry benzene after wet benzene | Ex. X after heating in helium |
|---|---|---|---|---|
| Product Analysis | | | | |
| Methylcyclopentane | 0.32 | 0.14 | 0.22 | 0.16 |
| Cyclohexane | 18.35 | 23.42 | 23.11 | 16.18 |
| Benzene | 58.52 | 62.54 | 61.34 | 75.67 |
| Cyclohexylbenzene | | | | |
| Impurities | 0.45 | 0.21 | 0.28 | 0.16 |
| Cyclohexylbenzene | 17.48 | 12.27 | 13.20 | 6.71 |
| Dicyclohexylbenzene Imp. | 0.18 | 0.02 | 0.01 | 0.02 |
| Dicyclohexylbenzenes | 4.70 | 1.41 | 1.84 | 1.10 |
| % of Hydrogen Consumed Used to Make $C_6$ Naphthenes | 69 | 82 | 81 | 85 |

EXAMPLE XI

A catalyst is prepared by impregnating a support containing a mixture of 84 percent silica-alumina and 16 percent of a rare-earth exchanged Y-zeolite (having a Si: Al atom ratio of 2.4:1 and a 11 wt% content of rare earths) with an aqueous solution of cobalt nitrate, extruding, drying, and calcining at increasing temperatures to a maximum of 800°C. for 3 hours in air. The catalyst was then treated at 300 VHSV in flowing hydrogen at atmospheric pressure and 480°C. The catalyst was used to hydroalkylate benzene which had been thoroughly dried over sodium. The activity of the fresh catalyst is listed in Table V as Example XI. After a period of 122 hours operation on various feeds, the catalyst had become partially deactivated. At this time, the hydrocarbon feed was stopped and the catalyst was heated to 317°C. for 2 hours at 300 VHSV in flowing hydrogen at atmospheric pressure and then cooled to 130°C. prior to restarting with dry benzene feed. The Table lists the results (Example XII) on the regenerated catalyst.

TABLE V

|  | Example XI fresh catalyst | Example XII Catalyst regenerated in hydrogen at 317°C. |
|---|---|---|
| Process Conditions |  |  |
| Hours-on-stream | 6 | 6 |
| Unit Pressure, psig | 295 | 265 |
| Inlet Temp. °C. | 133 | 130 |
| Max. Catalyst Bed Temp. °C. | 237 | 227 |
| L H S V Benzene | 2 | 2 |
| Hydrogen to Benzene Mole Ratio | 0.66:1 | 0.68:1 |
| Product Analyses, Weight % |  |  |
| Methylcyclopentane | 2.38 | 1.27 |
| Cyclohexane | 9.11 | 8.02 |
| Benzene | 56.18 | 52.04 |
| Cyclohexylbenzene Impurities | 2.46 | 1.05 |
| Cyclohexylbenzene | 24.82 | 25.11 |
| Dicyclohexylbenzene Impurities | 0.85 | 0.70 |
| Dicyclohexylbenzenes | 4.36 | 11.20 |
| Tricyclohexylbenzenes | — | 0.57 |
| Percentage of Hydrogen Consumned Used to Generate By-Product $C_6$ Naphthenes | 49 | 38 |

From the above table, it is evident that a regeneration temperature as low as 317°C. restores full activity. The regenerated catalyst is more selective in forming more cyclohexylbenzenes (primarily the dicyclohexylbenzenes) than is the original fresh catalyst at the same length of time on stream. The regenerated catalyst yields slightly less $C_6$ naphthenes and fewer impurities in the cyclohexylbenzene boiling range (eg only 4.0% impurities in the CHB fraction for the regenerated catalyst versus 9.0 percent impurities in the CHB fraction for the fresh catalyst) when the processing conditions were virtually the same. Phrasing it another way, for the rejuvenated catalyst, less of the hydrogen consumed is used to form $C_6$ naphthenes (38%) than was the case for the fresh catalyst (49%).

Although this invention has been illustrated by reference to specific embodiments, it will be apparent to those skilled in the art that various changes and modifications may be made which clearly fall within the scope of this invention.

We claim:

1. The method of regenerating a spent hydroalkylation catalyst, intially treated with hydrogen at temperatures above about 400°C, which has been used in hydroalkylation and which is characterized by a level of activity which is less than the initial level of activity, said spent catalyst containing (a) at least one oxidizable Group VIII metal selected from the group consisting of nickel and cobalt, and (b) zeolite dispersed in a silica-alumina matrix which comprises heating said spent catalyst, in the presence of gas containing at least 30 mole percent hydrogen and being substantially free of active components which are capable of reacting with any of the materials in the system, to regeneration temperature of 310°C–650°C for 1–24 hours thereby regenerating said spent hydroalkylation catalyst.

2. The method as claimed in claim 1 wherein said catalyst contains a Group VI metal.

3. The method as claimed in claim 2 wherein said Group VI metal is tungsten.

4. The method as claimed in claim 1 wherein said acidic oxide support is a hydrogen Y-zeolite.

5. The method as claimed in claim 3 wherein said spent catalyst contains 6 percent nickel, 19 percent tungsten, and 22 percent hydrogen Y-zeolite.

6. The method of regenerating a spent nickel-tungsten on hydrogen Y-zeolite dispersed in a silica-alumina matrix hydroalkylation catalyst, initially treated with hydrogen at temperatures above about 400°C, which catalyst has been used in hydroalkylation and which is characterized by a level of activity which is less than the initial level of activity, which comprises heating said spent catalyst to regeneration temperatures above about 310°C for 1–24 hours thereby regenerating said spent catalyst; and maintaining said spent catalyst during said regeneration in the presence of gas containing at least 30 mole percent hydrogen and being substantially free of active components which are capable of reacting with any of the materials in the system.

* * * * *